United States Patent [19]

Walsh

[11] 4,314,547
[45] Feb. 9, 1982

[54] SOLAR HOT WATER SYSTEM WITH SUB-LOOP HYDRONIC HEATING

[76] Inventor: Justin E. Walsh, 16 Thayer Pl., Brookline, Mass. 02146

[21] Appl. No.: 117,833

[22] Filed: Feb. 4, 1980

[51] Int. Cl.³ .............................................. F24J 3/02
[52] U.S. Cl. .................................... 126/428; 126/427; 126/435; 237/8 R; 237/70
[58] Field of Search .............. 126/428, 432, 435, 437, 126/421, 427; 237/7, 16, 70, 71, 8 R; 165/154

[56] References Cited

U.S. PATENT DOCUMENTS

| | | | |
|---|---|---|---|
| 414,157 | 10/1889 | McElroy | 165/154 |
| 3,277,272 | 10/1966 | Rill et al. | 237/16 X |
| 3,443,062 | 5/1969 | Welch, Jr. | 237/16 X |
| 3,977,601 | 8/1976 | Bearzi | 126/427 X |
| 4,143,814 | 3/1979 | Hill, Jr. | 126/428 X |

*Primary Examiner*—Larry Jones
*Attorney, Agent, or Firm*—Morse, Altman, Oates & Dacey

[57] ABSTRACT

A system is provided for heating a building with solar energy by means of solar panels provided with hydronic sub-loops which connect with radiators separately heated by a furnace. Each hydronic sub-loop serves to supplement heat from the furnace and, while an integral part of each radiator, nevertheless is separate from the furnace system, and provides heat exchanging action therebetween. Separate circulating pumps, valves and control means are disclosed for operation in conjunction with a furnace and radiator circulating system.

1 Claim, 4 Drawing Figures

SOLAR HOT WATER SYSTEM WITH SUB-LOOP HYDRONIC HEATING

BACKGROUND OF THE INVENTION

1. Field of the Invention

This invention relates generally to a solar heating system and more particularly is directed towards a solar heating system having a hydronic sub-loop heating system which is operatively associated with the heating system of the furnace to supplement the heat from the furnace.

2. Description of the Prior Art

Conventional solar heating systems generally are comprised one or more solar panels mounted on the roof of a building and provided with conduits and one or more circulators which circulate a heat exchanging liquid through the panel where it is heated and then to a heat storage and heat exchanger unit, typically located in the basement of the building. The heat storage unit typically is a tank filled with water used for washing and other such purposes in the building.

Typically, conventional solar heating systems have been used primarily for heating household water, but have not been used satisfactorily for heating the building itself. It is believed that this is due to the fact that in northern latitudes insufficient energy is available from solar panels to heat adequately the building on which the panels are mounted nor heretofore has there been any satisfactory means for using solar heating in such a way as to supplement conventional heating systems.

Accordingly, it is an object of the present invention to provide a new and improved solar heating system with sub-loop hydronic heating to provide supplemental heat to conventional heating systems.

Another object of this invention is to provide hydronic heat exchanging units in which a liquid heat exchanging medium is circulated through a radiator separately from another heat exchanging medium circulated from a furnace whereby the radiator is heated by one or both heat sources.

SUMMARY OF THE INVENTION

This invention features a solar heating system with sub-loop hydronic heating for use with a conventional heating means, comprising at least one radiator located within a building, at least one solar heating panel mounted in a position exposed to sunlight for heating a liquid circulated therethrough, first conduit means connected between the solar heating panel and the radiator, a furnace, second conduit means connected between the furnace and radiator for circulating heated water therethrough along a path separate from the first conduit but in heat exchanging relation thereto, and control means for selectively operating the panel heating system and furnace system, as required.

This invention also features a novel radiator for use in conjunction with a solar heating system having a sub-loop hydronic heating system in which furnace-heated water is circulated in one loop while a liquid heated by solar means is circulated through a separate but integral loop.

BRIEF DESCRIPTIONS OF THE DRAWINGS

DETAILED DESCRIPTION OF THE PREFERRED EMBODIMENTS

Figure 1:
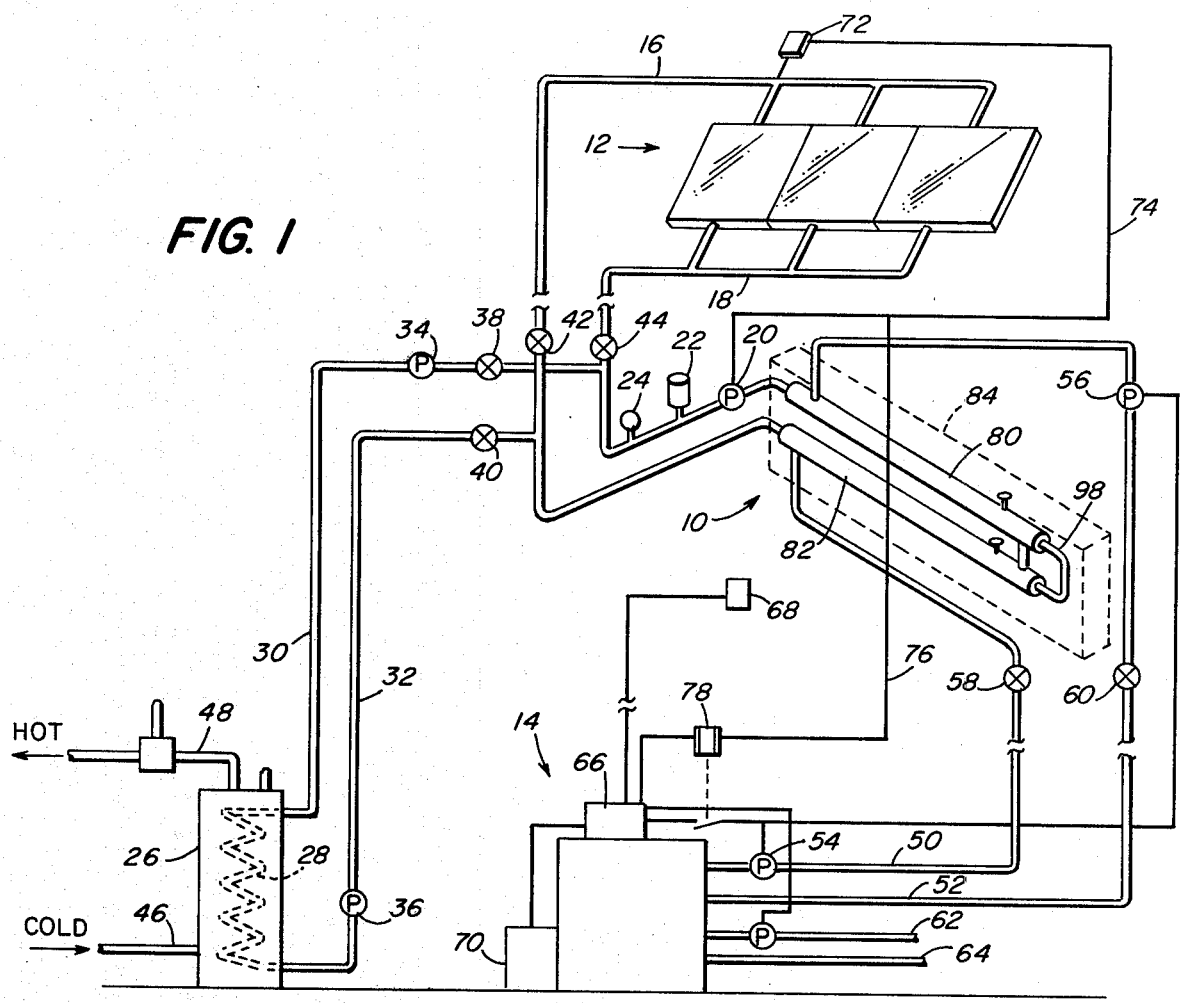
FIG. 1 is a schematic view of a heating system made according to the invention.

Referring now to the drawings and to FIG. 1 in particular, the invention is generally organized about a radiator 10, typically of baseboard configuration and normally mounted in the room of a building along the floor and against a wall thereof. For purposes of illustration, only one radiator is shown although it will be understood that in most installations several such radiators would be employed with perhaps two or more in each room. However, since all radiators will be of similar construction and operation only one is shown for the sake of clarity.

The radiator 10 is connected to two separate but interconnected heating sources, one being an array of solar panels 12 and the other being a furnace 14. The solar panels 12 may be any one of a variety of commercially available panels which, typically are mounted on the roof of a building and oriented in a southerly direction for exposure to the sun. In practice, the solar panels are employed to raise the temperature of a heat exchanging liquid circulated therethrough and for this purpose ethylene glycol provides satisfactory results. The solar panels, which are of sufficient size and number to provide adequate heating performance for the size of the building involved, are connected by an inlet conduit 16 and an outlet conduit 18 to the radiator 10, with the solar-heated ethylene glycol circulated through the radiator 10 and the solar panels 12 by means of a circulating pump 20 in the line 18. The line 18 also includes an expansion tank 22 and a bleeding valve 24. Also connected to the solar panels 12 is a hot water heater 26, typically located in the basement of the building and provided with a heat exchanging coil 28 mounted within the heater and connected by conduits 30 and 32 to the solar panel conduits 16 and 18, as shown. The conduits 30 and 32 are provided with circulator pumps 34 and 36 as well as with valves 38 and 40. Similarly, the solar conduits 16 and 18 are provided with valves 42 and 44 for isolating the solar panels when required. The water tank 26 is provided with a cold water inlet 46 and a hot water outlet 48 which distributes hot water to the building for washing, etc.

The furnace 14 may be any one of a variety of readily available hot water furnaces and may be fired by gas, oil or the like. The furnace includes a pair of conduits 50 and 52 forming a loop to the radiator 10 and through which loop water heated by the furnace is circulated by means of circulator pumps 54 and 56. Typically, valves 58 and 60 are provided in the loop for isolating the radiator, if necessary. Additional loops, such as represented by conduits 62 and 64, may be provided for heating other areas of the building, the number of loops being determined by the number of different zones to be heated. The furnace 14 is provided with a controller 66 operatively connected to a thermostat 68 located within the zone that is being heated. Additional thermostats may be provided, one for each zone, as required. When the thermostatic switch is closed, the controller 66 is operated to start the furnace by first energizing a gas or oil gun 70 delivering fuel into the furnace. This also starts the circulating pumps 54 and 56 once the water temperature reaches the proper level. When the temperature in the zone has reached the desired temperature, the controller stops the oil burner and the circulating pumps.

The circulating pumps are also operated by means of a controller 72 operatively connected to the solar panels for sensing the temperature of the liquid therein. The controller 72 may be any one of a number of commercially available units, but in practice a triple function Aquastat controller available from Minneapolis-Honneywell Regulator Company has been found to be satisfactory. The controller 72 is connected by a lead 74 directly to the furnace and circulating pump which circulates the furnace-heated water through the radiator 10. A lead 76 connects from the lead 74 to a relay adapted to close the circuit to the hot water circulators 54 and 56, as required.

The radiator 10 is comprised of two separate but generally coextensive loops integrated into a single radiator unit by means of which ethylene glycol or the like, heated by the solar panel 12, can be circulated through one of the radiator loops for the purposes of heating the radiator totally or as supplemental heat for the furnace-heated radiator loop. The hot water loop from the furnace may also be used independently of or in conjunction with the solar loop for a maximum flexibility and efficiency.

Figure 3:
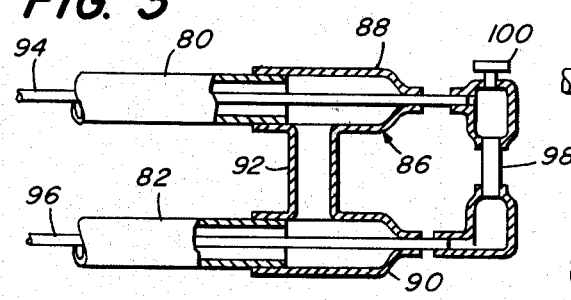
FIG. 3 is a detailed view in side elevation, partly in section, of a radiator made according to the invention, and, FIG. 4 is a view similar to FIG. 3 but showing a modification thereof.

The hot water loop from the furnace is comprised of parallel lengths of tubing 80 and 82, typically one inch diameter copper tubing, extending substantially the full length of a baseboard housing 84. The lengths of tubing of 80 and 82 are connected by customary fittings to the furnace conduits 50 and 52 to provide a loop for hot water from the furnace to the radiator. The opposite ends of the one inch tubing sections 80 and 82 are connected by a cross coupling 86 comprised of parallel tubular portions 88 and 90 joined by a tubular cross piece 92. The tubular portions tuypically are fabricated from copper, although other materials may be used, and have one end thereof formed with an inside diameter corresponding to the outside diameter of the tubing sections 80 and 82 to receive the ends thereof. Tubing sections 80 and 82 are soldered to the coupling 86 in the manner shown in FIG. 3.

The opposite ends of the tubular portions 88 and 90 are reduced to receive the ends of a pair of parallel tubing sections 94 and 96 mounted lengthwise and coaxially within the tubing sections 80 and 82. The tubing sections 94 and 96 are of a somewhat smaller diameter than the tubing sections 80 and 82 and, typically, one-half inch copper tubing is satisfactory. The reduced ends of the tubular portions 88 and 90 are soldered to the tubing sections 94 and 96 whereby the coupling 86 serves to hold the inner tubular sections 94 and 96 in the center of the outer tubing sections 80 and 82. The half inch tubing sections 94 and 96 connect to the solar unit 12 through the conduits 16 and 18. The outer ends of the tubing sections 94 and 96 extend beyond the coupling 86 and connect to a cross-over fitting 98 to form a loop between the inner tubing sections 94 and 96. A bleed valve 100 may be provided in the fitting 98 to remove air from the line.

It will be understood that when heated ethylene glycol or the like is circulated through the inner tubing conduits 94 and 96, this will cause furnace water in the tubing sections 80 and 82 to be heated. When sufficient heat is available from the ethylene glycol it is not necessary to start the furnace. However, if heat supplied from the solar panels is insufficient to provide the heat level desired, the furnace is automatically actuated and the solar units in the furnace combine with one another to raise the heat in the zone to the desired level.

Figure 2:
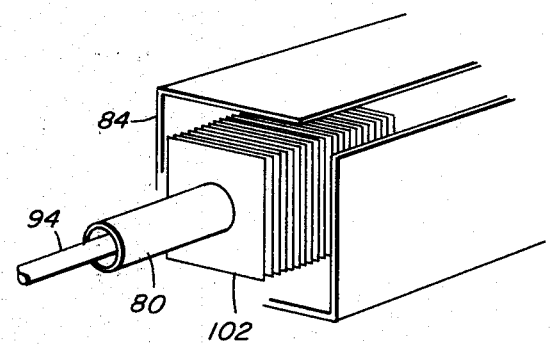
FIG. 2 is a detailed perspective view, partly broken away, showing a portion of a radiator made according to the invention.

In order to enhance the transfer of heat from the radiators to the zone being heated, radiator fins 102 may be disposed along the outer surface of the tubing sections 80 and 82, as suggested in FIG. 2.

Figure 4:
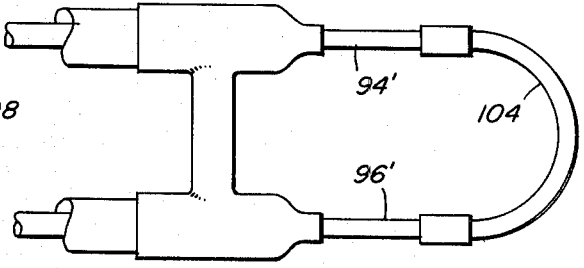

Referring now to FIG. 4 of the drawings there is illustrated a modification of the invention as it pertains to the radiator, where, in place of the cross-piece 98, a U-shaped bend 104 is provided for completing a loop between tubing sections 94' and 96'.

While the invention has been described with particular reference to the illustrated embodiments, numerous modifications thereto will appear to those skilled in the art.

Having thus described the invention, what I claim and desire to obtain by Letters Patent of the United States is:

1. A heating system for a building comprising in combination (a) at least one radiator located within said building,
(b) at least one solar heating panel mounted in position for heating a first liquid,
(c) first conduit means connected between said panel and said radiator,
(d) first circulator means operatively connected to said first conduit means for circulating said first liquid through said panel and said radiator,
(e) a furnace operatively associated with said building for heating a second liquid,
(f) second conduit means connected between said furnace and said radiator,
(g) second circulator means operatively connected to said second conduit means for circulating said second liquid through said furnace and said radiator,
(h) said radiator providing separate flow paths for said first and second liquids in heat exchanging relation to one another,
(i) said radiator including a tubular outer conduit connected to one of said first and second conduits and a tubular inner conduit extending coaxially through said outer conduit to define an annular passage therewith and connected to the other of said first and second conduits,
(j) said inner and outer conduits being formed into generally parallel U-shaped loops, and,
(k) a first cross-coupling connected between the ends of said outer conduit to provide a flow path therebetween and a second cross coupling located exterior to said first cross-coupling and connected between the ends of said inner conduit to provide a flow path therebetween.

* * * * *